Patented Nov. 2, 1937

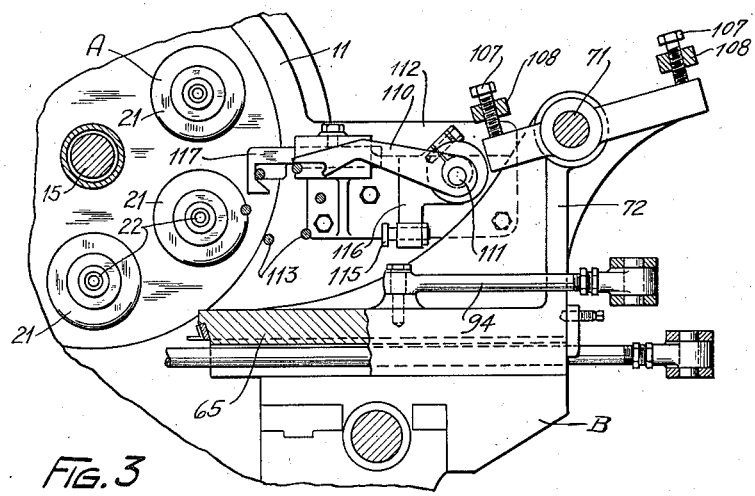
Fig. 3
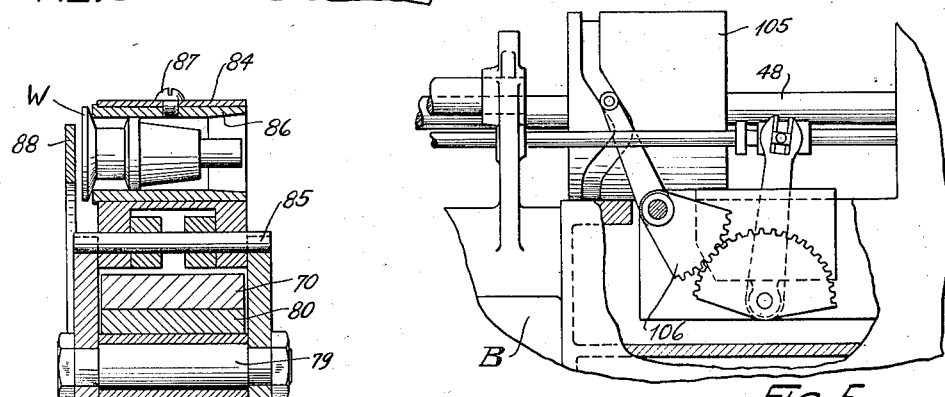
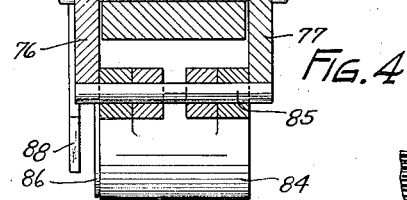
Fig. 4
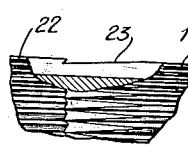
Fig. 7
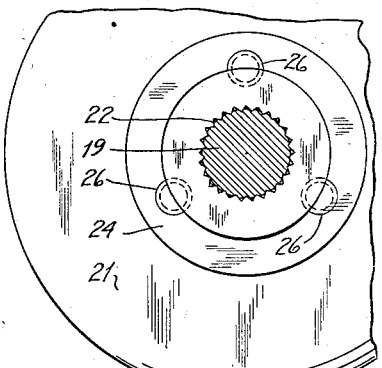
Fig. 5 / Fig. 8
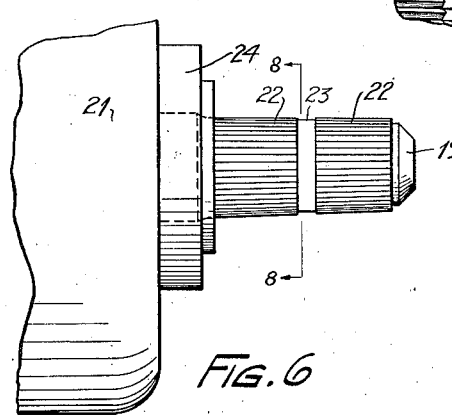
Fig. 6
INVENTOR.
HARRY W. RUPPLE
BY
Kwis, Hudson & Kent
ATTORNEYS.

2,097,646

UNITED STATES PATENT OFFICE 2,097,646

METALWORKING MACHINE

Harry W. Rupple, Shaker Heights, Ohio, assignor to The Cleveland Automatic Machine Company, Cleveland, Ohio, a corporation of Ohio Application November 2, 1934, Serial No. 751,213

13 Claims. (Cl. 29—38)

The present invention relates to automatic metal working machine tools, and particularly to the work spindle construction thereof and mechanical blank feeding mechanism for either single or multiple spindle indexible spindle turret types of machines.

The present invention contemplates a machine tool which comprises one or a plurality of work spindles provided with work holding arbors at the front end thereof rotatably supported in the machine frame, or in an indexible turret in the case of an indexible spindle turret type of machine. In the latter type of machine, the turret is periodically indexed to carry the spindles successively through a plurality of tool stations where predetermined operations are performed on work blanks supported in the spindle chucks. In either type of machine, the tools are carried by a main tool slide, cross-slides, and/or head slides, depending upon the particular construction of machine and the operations to be performed on the work blanks. The finished work blanks are removed from and rough blanks inserted on the arbor or arbors, an operation hereinafter referred to as loading, at predetermined intervals in timed relation to the other operations of the machine preferably by automatic mechanism. In the indexible spindle turret type of machine, the loading operation is performed at one of the stations, referred to as the loading station, from which the tools are omitted as the spindles are successively indexed therethrough.

An object of the present invention is the provision of a novel single or multiple spindle machine tool of the character referred to comprising one or a plurality of rotatable work or blank supporting arbors.

Another object of the invention is the provision of a novel multiple work spindle indexible work spindle turret type of machine tool comprising a plurality of work or blank supporting arbors on the spindles thereof.

Another object of the invention is the provision of a novel automatic metal working machine of the character referred to comprising one or a plurality of work or blank supporting arbors and automatic blank feeding or loading mechanisms for periodically loading blanks on the arbors.

Another object of the invention is the provision of a novel automatic metal working machine tool of the multiple work spindle, indexible work spindle turret type of machine comprising a plurality of work or blank carrying arbors on the work spindles thereof, and automatic mechanical blank ejecting and feeding or loading mechanism for periodically removing work blanks from the arbors, and loading new blanks thereon in the loading station.

The invention resides in certain novel features and details of construction and combinations and arrangements of parts, and further objects and advantages thereof will be apparent to those skilled in the art to which it pertains, from the following description of the preferred embodiment thereof described with reference to the accompanying drawings, in which Fig. 1 is a plan of an automatic metal working machine embodying the present invention with portions shown in horizontal section approximately through the axis of the lower rear spindle.

Fig. 3 is a section approximately on the line 3—3 of Fig. 1.

Fig. 4 is a section on the line 4—4 of Fig. 2 through the upper sprocket wheels of the conveyor.

Fig. 5 is a front elevation of part of the machine with portions broken away showing the mechanism for operating part of the loading apparatus.

Fig. 6 is an enlarged elevation of the front end of one of the spindles.

Fig. 7 is an enlarged view of a portion of the arbor showing the cylindrical or reverse section taper, and Fig. 8 is a section on the line 8—8 of Fig. 7.

Similar reference characters designate corresponding parts throughout the several views of the drawings.

Figure 1:
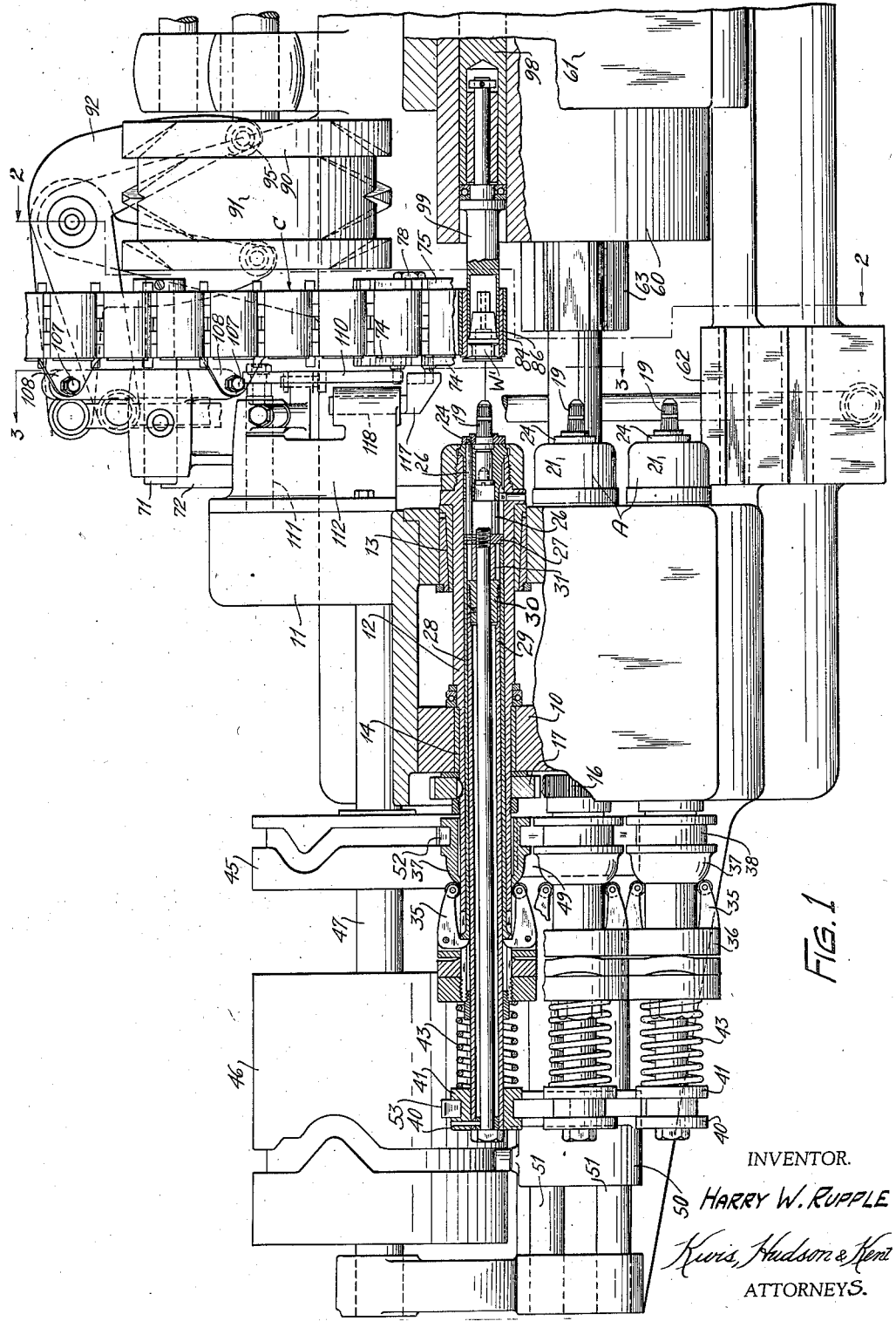
Figure 2:
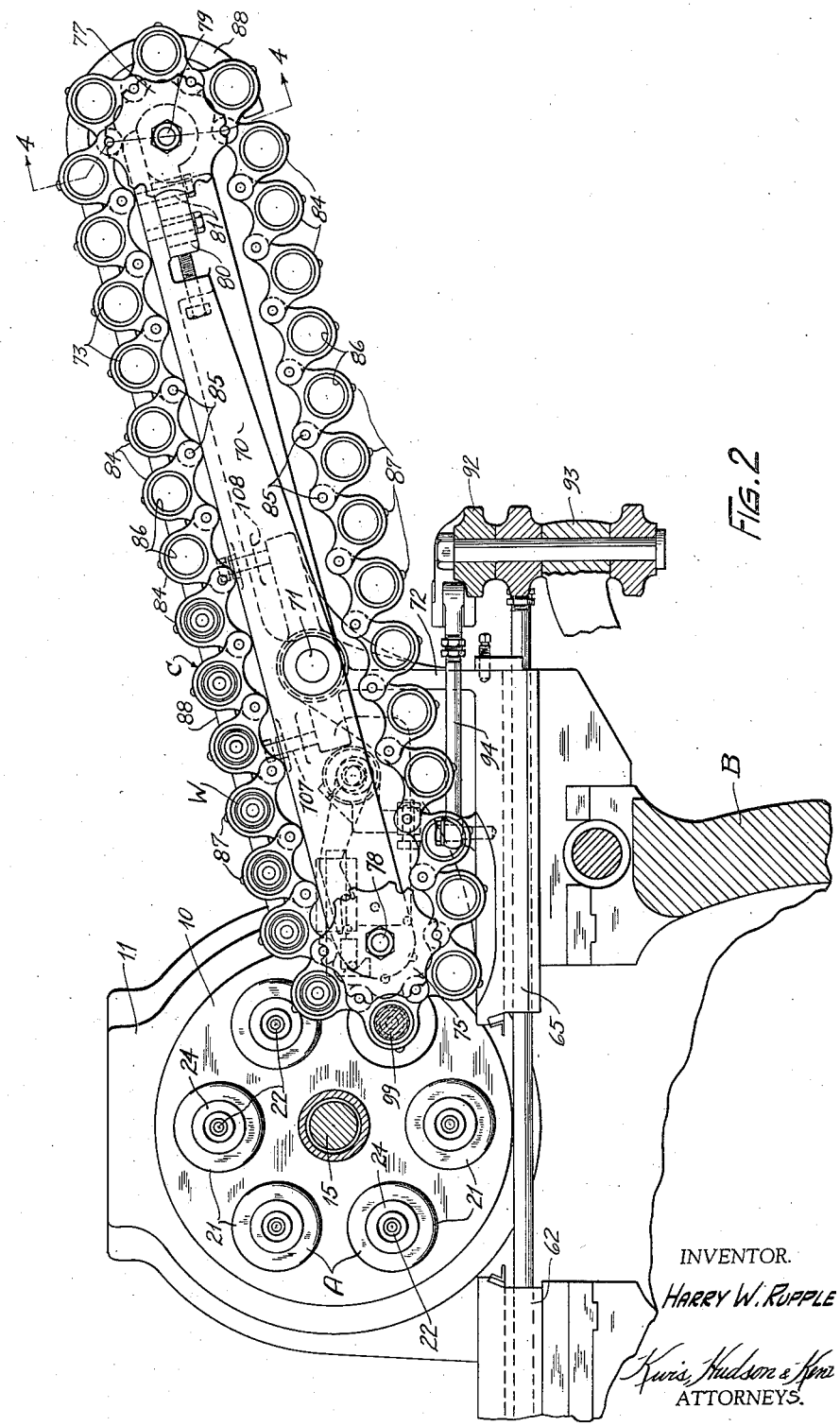
Fig. 2 is a section approximately on the line 2—2 of Fig. 1.

The invention is particularly applicable to a multiple spindle indexible work spindle turret type of machine, and is herein described and illustrated as embodied in a six spindle, indexible work spindle turret type of "Cleveland Automatic" machine, and only those parts of the machine which are necessary to a clear understanding of the invention are illustrated and described. The remainder of the machine is old and well known in the art and may be found embodied in a plurality of different structures.

Referring to the drawings, a plurality of work spindles A, in the present instance six, are rotatably supported in longitudinal apertures in a work spindle turret 10 rotatably supported in a spindle turret head 11 on the frame of the machine designated in general by the reference character B. The spindles are equally spaced about the axis of rotation of the turret and are successively carried through the loading and tool stations upon the indexing of the turret. The spindles A are identical in construction and comprise a spindle tube 12 rotatably supported by suitable bearings 13 and 14 provided with means for taking up wear, etc. The spindle tubes 12 are similar to those illustrated in United States Patent No. 1,950,931 and are rotatably supported in the spindle turret 10 and driven from the main drive shaft 15 of the machine through the medium of gears 16 and 17 in a similar manner.

Each of the spindles A comprises a work arbor 19 secured to a member 20 carried in the front end of the spindle tube 12 and detachably secured thereto through the medium of a cap member 21 threaded onto the forward end of the spindle tube. The work arbor is preferably formed or shaped to accommodate the contour of the particular piece of work being operated upon. In the illustrated embodiment of the invention the work or blank engaging part of the arbor 19 is slightly tapered, .030'' per inch, and grooved or fluted to provide twenty-five 90° included angle teeth 22. Approximately midway between the ends of the fluted section of the arbor a cylindrical or reverse tapered section 23 is provided on the taper, in the present instance ⅛ inch wide, which produces cutting edges on the forward ends of the teeth above the same.

At the loading station which, as illustrated, is the lower rear station or position, the finished work blank is pushed off the arbor 19 by means of a ring-shaped ejector 24, slidably supported thereon, and a new blank loaded on the arbor by means of mechanism hereinafter referred to. The ejector 24 is operatively connected to a disc member 27 slidably supported within the spindle tube 12 by means of a plurality of rods 26, in the present instance three, slidably supported within the member 20. The ejector 24 is operated first, to loosen the work or blank on the arbor 19, through the medium of a tubular member 28 slidably supported within the spindle tube 12, the forward end of which abuts the disc member 27, and second, to shove the finished blank completely off the arbor through the medium of a tubular member 29, the forward end of which is provided with a member 30 in engagement with a bushing 31 positioned between said member and the disc member 27.

The tubular member 28 is moved forward in spindle tube 12 to loosen the work or blank on the arbor by bell-crank levers 35 pivotally supported in a block 36 slidably supported on the spindle tube 12. The short arms of the bell-crank levers engage a head formed on the rear end of the tubular member 28 and the long arms thereof engage an operating thimble 37 slidably supported on the spindle tube 12 and provided with annular grooves 38. The tubular member 29, hereinafter called the ejector tube, is provided with a head 40 having an annular groove 41 therein. The members 27, 29, 30, and 31 and the head 40 of the ejector tube are held in assembled relationship by a long bolt 42 extending coaxially through the spindle from the rear and threaded into the disc member 27. The ejector member 24, rods 26, disc member 27, ejector tube 29, member 30, bushing 31, head 40, and bolt 42 operate as a unit and are continuously urged towards the left as viewed in Fig. 1 by means of the compression spring 43 positioned between the head member 40 and the rear end of the spindle tube 12. The spring 43 not only retracts the ejector mechanism but eliminates any possibility of the ejector member 24 working forward and loosening the work or blank on the arbor during operation. The operating thimble 37 and the ejector tube 29 are both under the control of cam plates or cam grooves on cam drums 45 and 46, respectively, carried by an auxiliary cam shaft 47 driven from the main cam shaft 48 of the machine in any conventional manner, and are actuated in predetermined timed relation to each other and to the other operations of the machine by mechanism which comprises members 49 and 50 slidably supported on the parallel rods 51 secured in the machine frame B and provided with brass shoe plates 52 and 53, respectively, which project into the annular grooves 38 and 41, respectively, in the loading station.

In the preferred embodiment of the machine illustrated, the tools are carried by a main tool slide 60 slidably supported in a tool slide head 61, a front cross slide 62 supported on suitable ways formed on the frame A, and an auxiliary tool slide 63 fixed to the main tool slide 60. The rear cross slide 65 which is similar in construction to the front cross slide 62 is employed to support a blank magazine designated in general by the reference character C, hereinafter referred to. The tool slides are all of conventional construction and are operated in a manner well known in the art, and a detailed description thereof is considered unnecessary. The spindle turret 10 is periodically indexed to successively move the spindles A through the various stations, including the loading station, by mechanism well known in the art, and the blanks, designated by the reference character W, are automatically loaded on the arbors at the loading station as the spindles are successively indexed therethrough.

The blank magazine C comprises a frame member 70 pivotally supported on a shaft 71 secured in a bracket 72 formed integral with the rear cross slide 65, and an endless chain conveyor 73 supported on a plurality of sprocket wheels 74, 75, 76, and 77. Sprocket wheels 74 and 75 are carried by a short shaft 78 rotatably supported in the lower end of the frame 70, and the sprocket wheels 76 and 77 are carried on a shaft 79 rotatably supported in a bracket 80 adjustably secured to the frame 70, for the purpose of taking up slack in the endless conveyor 73, by means of bolts 81 threaded into the frame 70 and extending through elongated slots in a bracket 80. The endless conveyor 73 is made up of links 84 secured together by pintle pins 85 and having longitudinal apertures extending therethrough within which blank holding bushings 86 are secured by means of set screws 87. The interior of the bushings 86 is formed to the contour of the work blanks which are manually inserted therein at the outer or upper end of the magazine. A guard 88 carried by the frame 70 prevents the blanks W from working out of the bushings 86.

The magazine C is under the control of, and is reciprocated bodily transversely of the longitudinal axis of the machine in predetermined timed relation to the other operations thereof, by cam plates 90 on a cam drum 91 carried by the main cam shaft 48 of the machine, operatively connected to the rear cross slide 65 through the medium of a bell-crank lever 92 pivotally supported at the rear of the machine by a horn 93 on the frame B, an adjustable link 94 pivotally connected to cross slide 65 and one arm of the bell-crank lever 93, and a cam roller 95 on the other arm of the bell-crank lever which engages in the groove formed by the cam plates.

When the magazine C is in its forward position, that is the position illustrated in the drawings, the lower work blank W' is in axial alignment with the spindle in the loading station. With the parts in this position an accelerated shaft or spindle 98, slidably supported in the main tool slide 60 and provided with a rotatably supported blank engaging head 99, is advanced to engage the work blank W' and push the same onto the arbor 19. The accelerated spindle 89 is actuated from a cam drum 105 on the main cam shaft 48 of the machine through the medium of linkage designated in general at 106, see Fig. 5, in a manner well known in the art.

The forward position of the magazine C and, in turn, the lower work blank W', can be adjusted by varying the length of the adjustable link 94 or by changing the cam plates 90, and the vertical position thereof can be adjusted, to bring the work blank into axial alignment with the accelerated spindle which in turn is in axial alignment with the spindle A in the loading station by rotating the frame member 70 about the shaft 71, by means of adjusting screws 107 threaded into projections 108 on one side of the frame member, the ends of which abut projections on the bracket 72.

Upon each reciprocation of the magazine C the endless conveyor 73 is advanced a predetermined distance to bring a new work blank into feeding position, by the engagement of a forked end of a pawl lever 110 pivotally supported on an eccentric pin 111 secured in a bracket 112 bolted or otherwise fixed to the turret head 11, with one of a plurality of pins 113 secured to the side of the sprocket wheel 74. The operation of the lever 110 and the pins 113 is similar to that of a pawl and ratchet. The amount of advance imparted to the conveyor 73 upon each reciprocation of the magazine can be adjusted by turning the eccentric pin 111 in the bracket 112 and securing the same in the desired position. Overrun of the conveyor 73 is prevented by an adjustable stop 115 threaded into an arm 116 on the bracket 112 positioned to engage one of the lower pins 113 when the magazine is in its rear position. Any possible overrun of the conveyor due to rapid reciprocation of the same is compensated for by an adjustable stop 117 secured in a boss 118 on the bracket 112 adapted to engage the upper front pin 113 when the conveyor is in its forward position.

It is believed that the operation of the machine will be apparent from the foregoing description thereof, suffice it to say that with the parts in the position shown in the drawings, the magazine C is in its forward position with the lower work blank W' in axial alignment with the accelerated spindle 98 and the work spindle A in the loading station, and the accelerated spindle 98 is advancing preparatory to pushing the blank from the conveyor onto the arbor. As the blank moves over the arbor the pressure therebetween is relieved by the cutting edges on the second section of teeth. The pressure on the accelerated spindle 98 is also relieved in like manner. After the blank W' has been positioned on the arbor the accelerated spindle or shaft is withdrawn after which the magazine C is moved to its rear position. Upon the rearward movement of the magazine C the endless conveyor 73 is advanced a predetermined distance to bring the next following blank into feeding position by the action of the lever 110 on one of the pins 113.

During the loading operation the blanks in the five tool stations are being operated upon by the tools positioned therein, and after the operations in the various stations have been completed, the tools are withdrawn and the spindle turret 10 indexed to advance the spindles A one station and bring the next succeeding spindle into the loading station. As soon as the spindle reaches the loading station the ejector mechanism is actuated to release the blank and eject the same from the spindle. Concurrently with this operation the magazine C is moving into its forward position to bring the next succeeding piece of work, which during the interim has been advanced one step as previously described, into axial alignment with the accelerated spindle 98, and the cycle of operation is repeated.

While the preferred embodiment of the arbor 19 has been illustrated, it will be apparent that the number of teeth 22, the taper thereof, and the number of cylindrical or reverse tapered sections 23, may be varied. The cutting edges produced by the sections 23 are used to relieve the pressure on the work and accelerated spindle, and the number thereof depends upon the amount of taper, the strength of the blank, and its flexibility etc., and in some instances can be omitted altogether.

From the foregoing description of the preferred embodiment of the invention it will be apparent that the objects of the invention have been attained. While the invention has been illustrated and described with reference to the preferred embodiment thereof, I do not wish to be limited to the particular construction illustrated and described, which construction may be varied within the scope of this invention. This application is intended to cover all variations, adaptations and uses thereof that come within the knowledge and customary practice of those skilled in the art, and I particularly point out and claim as my invention the following:

1. In a machine of the character referred to the combination of a rotatable spindle, an arbor on said spindle adapted to support a work blank, an endless conveyor supported adjacent the spindle adapted to support a plurality of work blanks, means for periodically moving said conveyor to present a work blank in axial alignment with said arbor, a member slidably supported in axial alignment with the spindle, means for reciprocating said member in predetermined timed relation to the movement of said conveyor whereby a work blank is transferred from said conveyor to said arbor, and means for ejecting work blanks from said arbor.

2. In a machine of the character referred to the combination of a frame, an indexible spindle turret rotatably supported by said frame, a plurality of spindles rotatably supported in said spindle turret, arbors on said spindles adapted to support work blanks, means for periodically rotating said spindle turret whereby said spindles are indexed through a plurality of stations one of which is a loading station, an endless conveyor supported adjacent the loading station adapted to support a plurality of work blanks, means for periodically moving said conveyor to present a work blank in axial alignment with said arbor, and means at said loading station for transferring work blanks from said conveyor to the arbor on the spindle in the loading station.

3. In a machine of the character referred to the combination of a frame, an indexible spindle turret rotatably supported by said frame, a plurality of spindles rotatably supported in said spindle turret, arbors in said spindles adapted to support work blanks, means for periodically indexing said spindle turret whereby said spindles are indexed through a plurality of stations one of which is a loading station, a magazine supported adjacent the loading station adapted to support a plurality of work blanks, means for periodically moving said magazine whereby work blanks supported thereby are moved into axial alignment with the arbor on the spindle in the loading station, and means at the loading station for transferring work blanks from said magazine to the arbor on the spindle in the loading station.

4. In a machine of the character referred to the combination of a frame, an indexible spindle turret rotatably supported by said frame, a plurality of spindles rotatably supported in said spindle turret, arbors on said spindles adapted to support work blanks, means for periodically indexing said spindle turret whereby said spindles are indexed through a plurality of stations one of which is a loading station, a magazine comprising an endless conveyor supported adjacent the loading station adapted to support a plurality of work blanks, means for reciprocating said magazine and means for advancing said endless conveyor whereby the work blanks supported thereby are successively brought into axial alignment with the arbor on the spindle in the loading station, and means at the loading station for transferring the work blanks from the conveyor to the arbors at the loading station.

5. In a machine of the character referred to the combination of a frame, an indexible spindle turret rotatably supported by said frame, a plurality of spindles rotatably supported in said spindle turret, arbors on said spindles adapted to support work blanks, means for periodically indexing said spindle turret whereby said spindles are indexed through a plurality of stations one of which is a loading station, an endless conveyor supported adjacent the loading station adapted to support a plurality of work blanks, means for periodically causing said conveyor to present a work blank in axial alignment with the spindle in the loading station, a member slidably supported in axial alignment with the spindle in the loading station, means for reciprocating said member whereby the work blanks supported by said conveyor are transferred to said arbors at the loading station, and means for ejecting work from said arbors.

6. In a machine of the character referred to, the combination of a frame, an indexible spindle turret rotatably supported by said frame, a plurality of spindles rotatably supported in said spindle turret, arbors on said spindles adapted to support work blanks, means for periodically indexing said spindle turret whereby said spindles are indexed through a plurality of stations one of which is a loading station, a bracket supported on the machine frame adjacent said loading station, a frame member pivotally supported by said bracket, an endless conveyor supported by said bracket adapted to support a plurality of work blanks, and means for transferring work blanks from said conveyor to said arbors at the loading station.

7. In a machine of the character referred to, the combination of a frame, an indexible spindle turret rotatably supported by said frame, a plurality of spindles rotatably supported in said spindle turret, arbors on said spindles adapted to support work blanks, means for periodically indexing said spindle turret whereby said spindles are indexed through a plurality of stations, one of which is a loading station, a bracket supported on the machine frame adjacent the loading station, a frame member supported by said bracket, a sprocket wheel rotatably supported by said bracket, an endless conveyor supported by said bracket and operatively connected to said sprocket wheel, means for intermittently rotating said sprocket wheel, and means for transferring work blanks from said conveyor to said arbors at the loading station.

8. In a machine of the character referred to, the combination of a frame, an indexible spindle turret rotatably supported by said frame, a plurality of spindles rotatably supported in said spindle turret, arbors on said spindles adapted to support work blanks, means for periodically indexing said spindle turret whereby said spindles are indexed through a plurality of stations, one of which is a loading station, ejectors carried by said spindles adapted to strip work blanks from said arbors, means for operating said ejectors in predetermined timed relation to the indexing of said turret, a bracket slidably supported on a machine from adjacent the loading station, a frame member pivotally supported by said bracket, means for adjusting said frame member about its pivotal support, a sprocket wheel rotatably supported by said frame member, an endless conveyor adapted to support a plurality of work blanks supported by said frame member and engaging said sprocket wheel, means for reciprocating said bracket, and means for intermittently rotating said sprocket wheel whereby work blanks supported on said conveyor are successively moved into axial alignment with the spindle in the loading station, and means for transferring the work blanks from said conveyor to said arbors at the loading station.

9. A spindle for a machine of the character referred to, comprising an arbor adapted to support a work blank, an ejector for stripping a work blank from said arbor, means for initially moving said ejector longitudinally of said arbor a limited distance to loosen a work blank on said arbor, and separate means for subsequently moving said ejector longitudinally of said arbor a substantial distance.

10. In a machine of the character referred to, the combination of a work supporting arbor, an ejector for stripping work blanks from said arbor, means for initially moving said ejector longitudinally of said arbor a limited distance to loosen a work blank on said arbor, and independent means for subsequently moving said ejector longitudinally of said arbor a substantial distance.

11. In a machine of the character referred to, the combination of a frame, an indexible spindle turret rotatably supported by said frame, a plurality of spindles rotatably supported in said spindle turret, noncollapsible arbors carried by said spindles and adapted to support work blanks thereon, means for periodically rotating said spindle turret whereby said spindles are indexed through a plurality of stations, ejectors carried by said spindles for stripping work blanks from said arbors, means at or adjacent one of said stations for initially moving said ejectors a limited distance along said arbors to loosen the work blanks thereon, and means at or adjacent the same station but separate from the last mentioned means for subsequently moving said ejectors a substantial distance along said arbors.

12. In a machine of the character referred to, the combination of a frame, a spindle rotatably supported in said frame, a work supporting arbor at one end of said spindle, an ejector movable longitudinally of the spindle for stripping a work blank from said arbor, a tubular member movable longitudinally of said spindle for moving said ejector, a bell crank lever for moving said tubular member, a cam thimble slidable longitudinally of the spindle for moving said bell crank lever, a second member for moving said ejector longitudinally of said spindle, means for moving said cam thimble, and means for moving said second member.

13. In a machine of the character referred to, the combination of a frame, a spindle rotatably supported in said frame, a work supporting arbor at one end of said spindle, an ejector movable longitudinally of said arbor for stripping a work blank therefrom, a tubular member inside of said spindle and movable longitudinally thereof for moving said ejector, a bell crank lever for moving said tubular member, a cam thimble slidable longitudinally of the spindle for moving said bell crank lever, means for moving said cam thimble, a second member within said tubular member for moving said ejector longitudinally of said spindle, and means for moving said second member in predetermined timed relation to the movement of said cam thimble.

HARRY W. RUPPLE.